United States Patent [19]  [11] 4,004,992
Tyler et al.  [45] Jan. 25, 1977

[54] POWER SUPPLY FOR ELECTROCHEMICAL MACHINING
[75] Inventors: Roger K. Tyler, Detroit; James D. Andrews, Birmingham, both of Mich.
[73] Assignee: TRW Inc., Cleveland, Ohio
[22] Filed: Mar. 15, 1976
[21] Appl. No.: 666,767

Related U.S. Application Data
[63] Continuation-in-part of Ser. No. 539,318, Jan. 8, 1975, abandoned, which is a continuation of Ser. No. 347,779, April 4, 1973, abandoned.
[52] U.S. Cl. .................. 204/129.55; 204/129.43
[51] Int. Cl.² ........................................ C25F 3/00
[58] Field of Search ...... 204/129.4, 129.43, 129.55

[56] References Cited
UNITED STATES PATENTS
3,417,006  12/1968  Inoue ........................ 204/129.43
3,793,170  2/1974  Andrews ...................... 204/129.6

OTHER PUBLICATIONS
Steel Features, "Liquid Streams Drill Holes in Tough Metals," Feb. 24, 1967, pp. 49–52.

Primary Examiner—Herbert T. Carter
Assistant Examiner—Wayne A. Langel

[57] ABSTRACT
Method of electrochemical drilling of the type in which an insulating hollow electrode is positioned in closely spaced relation to an anodically charged workpiece and a cathodically charged electrolyte is passed through the electrode to impinge on the workpiece, utilizing a pulsating negative voltage on the electrolyte, the voltage having a substantial negative DC component and negative pulses superimposed thereon.

10 Claims, 6 Drawing Figures

U.S. Patent    Jan. 25, 1977    4,004,992
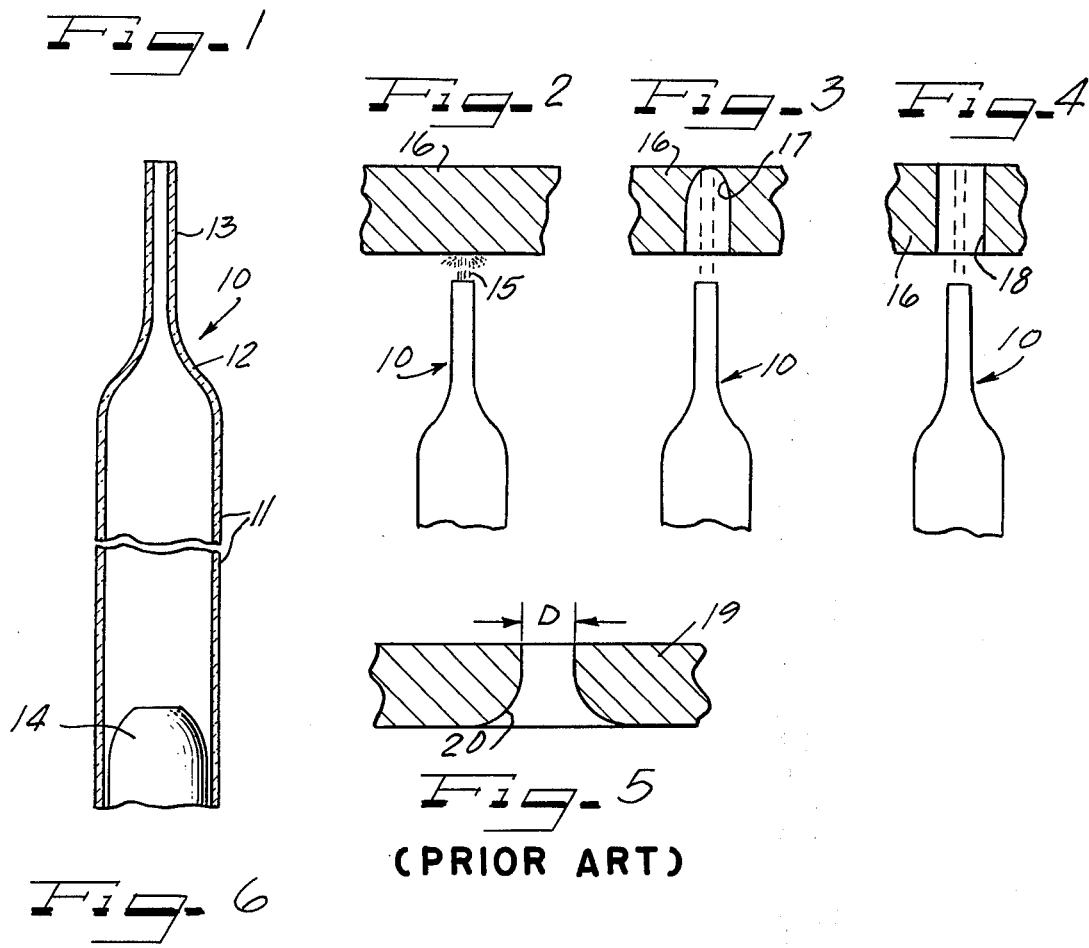
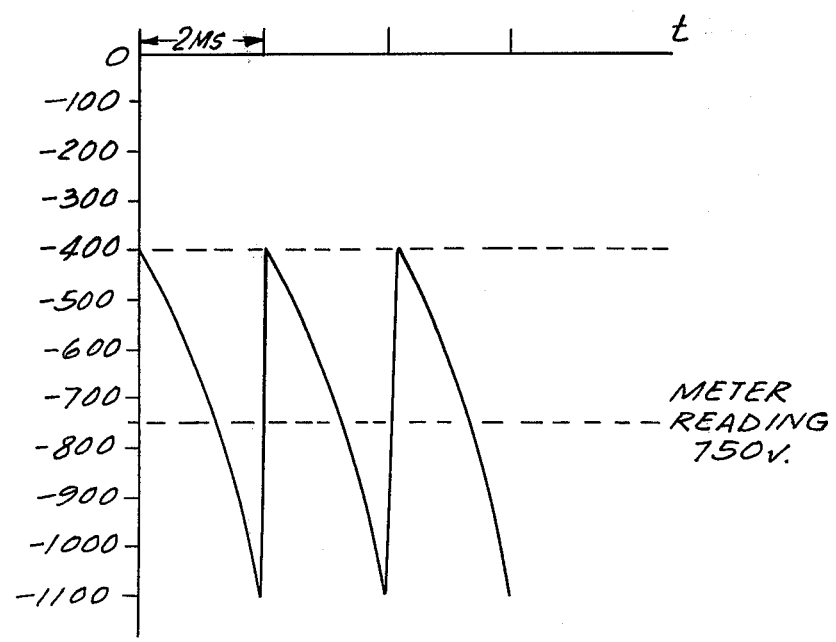

POWER SUPPLY FOR ELECTROCHEMICAL MACHINING

REFERENCE TO RELATED APPLICATIONS

This application is a continuation-in-part of our copending application Ser. No. 539,318 filed Jan. 8, 1975 (now abandoned) which in turn was a continuation of our Ser. No. 347,779 filed Apr. 4, 1973 and now abandoned.

BACKGROUND OF THE INVENTION

1. Field of the Invention

This invention is in the field of a power supply for electrochemical machining of the type employing a nozzle composed of insulating material which directs a stream of cathodically charged electrolyte at the workpiece to drill holes of controlled diameter through the workpiece.

2. Description of the Prior Art

There have been a number of electrochemical machining methods described and developed in the past. Electrochemical machining involves the use of a tool in the form of a nozzle which is made cathodic and which cooperates with an anodic workpiece through an electrolyte which contacts both the tool and the workpiece. Upon flow of electric current through the electrolyte, material of the workpiece is removed or depleted. These processes have been used to a large extent in drilling small diameter holes in metal which are difficult to drill mechanically.

One of the more recently developed processes employing electrochemical machining is the impingement process which is sometimes known as "Electrostream" (a trademark of General Electric Corp.) drilling. This process has been used to drill extremely small holes in tough metals such as nickel base superalloys. With this process, it is possible to drill holes having a diameter on the order of 0.005 to 0.020 inch. The impingement process normally makes use of a glass tube nozzle with an electrode behind the tip of the nozzle. The impingement process is operated under conditions of relatively high resistance and high voltage, typically on the order of 300 to 600 volts DC. Either a salt or an acid electrolyte is used. Electrolyte pressures in this type of process are typically on the order of 20 to 100 pounds per square inch.

It has been found difficult, however, in conventional electromachining operations of the impingement type to drill holes which have a uniform diameter throughout their axial length. Experience has indicated that the holes produced generally have tapered sides in the portion of the hole nearest to the electrode nozzle, and the desired diameter of the hole appears only at the vicinity of the hole farthest from the electrode. This condition, known as "washout" is particularly troublesome where a plurality of holes are to be drilled in closely spaced relation since the washout from adjoining holes can overlap resulting in an undesired depletion of metal in the surface of the workpiece between the holes.

The impingement process as it is presently practiced also suffers from the disadvantage that there is excessive wear on the tip of the insulating nozzle, requiring replacement of nozzles at relatively frequent intervals. While the cause for such wear has not been precisely determined, it is believed that superheated steam is generated under the conditions of sustained voltage application and that this steam attacks the glass electrode resulting in erosion by leaching of the glass composition.

SUMMARY OF THE INVENTION

The present invention provides a method for electrochemical drilling which makes it possible to produce holes of more uniform diameter than heretofore, and at the same time reduces the wear on the tip of the electrode.

The present invention is directed to an improved electrochemical drilling process in which the electrolyte is charged with a negative voltage having a substantial negative DC component and negative pulses superimposed thereon. The ripple used in the power supply constitutes from about 75 to 600% of the DC component, that is, the maximum swing of negative voltge in the pulses ranges from about 75 to 600% of the value of the DC component, but insufficient to cause a spark discharge to occur between the electrode and the workpiece. Best results are obtained when the pulses have a pulse repetition frequency of from 60 to 720 Hertz. The waveform of the pulses is generally of the saw tooth type although other wave shapes can be employed. The pulses constitute the sole source of electrochemical drilling current. Apparently, this periodic variation in the negative voltage allows the electrolyte liquid to remain cooler so that less superheated steam is produced during drilling.

Particularly good results are obtained by varying the voltages and currents as the drilling opertion progresses. It is particularly important in this regard that the voltage is increased when "breakthrough" is accomplished, this being the condition when the electrolyte emerges through the back face of the surface being drilled. By suitable regulation of the voltage and current, particularly at breakthrough, the method of the present invention can provide little or no washout, resulting in the production of holes of uniform diameter throughout their axial length.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a somewhat schematic view partly in cross-section illustrating the configuration of a typical electrode and nozzle assembly;

FIG. 2 is a schematic view of the nozzle and workpiece just at the commencement of hole drilling;

FIG. 3 is a view similar to FIG. 2 but illustrating the nozzle and workpiece just prior to breakthrough;

FIG. 4 is a view similar to FIGS. 2 and 3 and illustrating the nozzle and workpiece after the voltage has been stepped up subsequent to breakthrough to complete the drilling operation;

FIG. 5 is a fragmentary cross-sectional view of a workpiece in which a hole has been electrochemically drilled by an impingement method typical of the prior art; and FIG. 6 is a plot of a typical voltage waveform which can be used for the purposes of the present invention.

DESCRIPTION OF THE PREFERRED EMBODIMENTS

In FIG. 1, reference numeral 10 indicates generally an electrode assembly of the type used in accordance with the present invention and including a tube 11 composed of insulating material such as glass, the tube having a necked down portion 12 terminating in a relatively thin nozzle portion 13. Typically, the inner diameter of the nozzle may be on the order of 0.005 to 0.010 inch. Disposed rearwardly of the nozzle 13, and preferably within a manifold (not shown) which feeds a plurality of tubes 11 is a metallic electrode 14 which is connected to a source of pulsating negative voltage of the type to be described.

FIG. 6 illustrates a preferred wave shape for the negative waveform applied to the electrode 14. It consists of a generally saw tooth wave impressed over a predetermined negative DC potential which in the waveform shown in FIG. 6 is a negative 400 volts. As illustrated, the peak negative value reached is a negative 1100 volts. The root mean square (rms) voltage of the waveform shown in FIG. 6, as read on a conventional direct current meter would be about 750 volts. For the purposes of the present invention, the rms value of the voltage applied to the electrode is in the range from about 100 to 800 volts. Depending on the configuration of the waveform, peaks up to about 1200 volts or so can be achieved.

The particular waveform shown in FIG. 6 of the drawings has a 700 volt excursion from the constant DC value of 400 volts so that the ripple factor of the waveform illustrated in FIG. 6 is 175%. For the purposes of this invention, the ripple may range from about 75 to 600% of the predetermined DC component, and preferably from 100 to 300% of the DC component.

The frequency of the pulsations is also important to secure the best results. The waveform illustrated in FIG. 6 has a pulse duration of 2 milliseconds, so that the pulse repetition frequency is 500 Hertz. Generally, pulse repetition frequencies of from 60 to 720 Hertz have been found to be satisfactory.

A suitable electrolyte either of the salt or acid type is passed through the nozzle 13 at the object to be drilled. A sulfuric acid solution containing 15 to 30% by volume sulfuric acid and preferably about 20% by volume sulfuric acid is appropriate with electrolyte pressures ranging from 20 to about 100 pounds per square inch.

The spacing between the nozzle and the workpiece for drilling purposes should be controlled either manually or automatically at a distance dependent essentially upon the nature of the material being drilled. For most materials, a gap of about 0.030 to 0.060 inch will be satisfactory. It is important not to reduce the spacing below about 0.010 inch as excessive material removal might be encountered, resulting in the washout condition previously described.

In FIG. 2, the nozzle 10 is shown delivering an impinging stream of electrolyte 15 at a fixed distance from an anodically charged workpiece 16. As metal removal occurs, the current drops and it is then desirable to increase the voltage and current to compensate for this increased gap.

As drilling proceeds, a generally conical depression 17 is formed in the workpiece and ultimately, the electrolyte breaks through the rear surface of the workpiece 16. At this point, the effective gap rises substantially and it is particularly important to increase the voltage after breakthrough and maintain the increased voltage on the electrode 10 until a substantially uniform diameter hole 18 results. The extent of time required for this dwell procedure can be readily ascertained by a few preliminary tests.

The method of the present invention is capable of producing straight sided holes in a relatively short period of time. In contrast, impingement processes of the prior art utilizing a non-varying DC potential frequently result in the production of apertures of the type shown in FIG. 5 wherein a workpiece 19 is shown with a drilled hole having a substantially flared surface 20 and having the desired diameter D only in the region in which breakthrough was accomplished. This flared configuration, or washout as it is called, can be very undesirable, particularly where closely spaced holes are being drilled.

A particular schedule for increasing current and voltage can be derived after a few experimental tests. The following examples set forth treating schedules which have been found applicable in many cases.

EXAMPLE 1

A workpiece having a thickness of 0.100 inch was subjected to electrochemical drilling using an electrolyte pressure of 20 pounds per square inch, and an electrolyte of 20% sulfuric acid by volume. The gap between the electrode and the piece being drilled was maintained at between 0.030 and 0.060 inch. The drilling commenced with an applied voltage of 100 volts (rms) and a current draw of 100 milliamperes. When the current dropped to 90 milliamperes as drilling progressed, the voltage was increased to 300 volts, increasing the current to 120 milliamperes. The impressed voltage was a saw tooth voltage having generally the configuration shown in FIG. 6. When the current had subsequently dropped to 110 milliamperes, the voltage was increased to 600 volts, raising the current to 180 milliamperes. At breakthrough, the voltage was raised to 750 volts and the current draw was 60 milliamperes. The entire process for drilling through the workpiece to provide a hole of uniform diameter took 3½ minutes.

EXAMPLE 2

Another workpiece was drilled using the electrolyte, electrolyte pressure and gap of Example 1 except the starting voltage was 500 volts (rms). Breakthrough resulted in 2 minutes, whereupon the voltage was raised to 750 volts and maintained at that value for thirty seconds. The workpiece was found to have a uniform diameter hole with no significant washout.

The process of the present invention is believed to be more effective than conventional impingement processes because it allows pulses of higher voltages to be applied safely to the electrode, thereby supplying more power for hole drilling. Furthermore, the pulsing of the negative DC source allows the electrolyte liquid to remain cooler and less possibility exists for providing superheated steam at the working tip of the nozzle. With the system of the present invention, many closely spaced holes can be drilled simultaneously, a capability not ordinarily possessed by impingement processes of the prior art.

The wear on glass electrodes when using a conventional DC power supply having a ripple voltage of 1% or less was compared with the wear on identical electrodes using the pulsating DC power supply of the type described in this application. The following wear life figures compare the capillary length change of the electrode after various hours of operation.

| CAPILLARY LENGTH CHANGE | | |
|---|---|---|
| Hours | Filtered D.C. | Pulsating D.C. |
| 20 | .003 | 0 |
| 40 | .005 | 0 |
| 60 | .0075 | 0 |
| 80 | .0092 | 0 |
| 100 | .011 | 0 |
| 120 | .0132 | 0 |
| 140 | 0153 | 0 |
| 160 | .0171 | .001 |
| 180 | .0193 | .0022 |
| 200 | .002 | .0025 |

The drawings illustrate a process wherein the positioning of the workpiece and the nozzle are fixed. The power supply of this invention is also applicable to the standard feed drill process wherein the nozzle is moved into the hole as drilling progresses and the movement of the nozzle is terminated when breakthrough is achieved.

It should be evident that various other modifications can be made to the described embodiments without departing from the scope of the present invention.

We claim as our invention:

1. In the method of electrochemical drilling in which an insulating hollow cathodically charged electrode is positioned in closely spaced relation to an anodically charged workpiece and a highly conductive electrolyte is passed through said electrode to become cathodically charged and to impinge on said workpiece to initiate hole drilling, the improvement which comprises applying to said electrolyte a negative voltage having a substantial negative DC component and negative pulses superimposed thereon, said pulses providing a ripple which is from 75 to 600% of said negative DC component, the pulses being the sole source of the electrochemical drilling current, and the amplitude of the pulses being insufficient to cause a spark discharge to occur between the electrode and the workpiece.

2. The method of claim 1 in which said pulses have a pulse repetition frequency of from 60 to 720 Hertz.

3. The method of claim 1 in which said drilling is conducted through the use of periodically increasing voltage and current.

4. The method of claim 1 in which a through hole is drilled and said voltage is increased when the hole being drilled breaks through the workpiece.

5. The method of claim 1 in which said electrolyte is salt water or acid.

6. The method of claim 1 in which the rms value of the voltage applied to said electrode is in the range from 100 to 800 volts.

7. The method of claim 1 in which the spacing between the electrode and the workpiece is in the range of about 0.030 to 0.060 inch.

8. The method of claim 1 in which the pressure on the electrolyte is not in excess of 100 psi.

9. The method of claim 1 in which said pulses are of generally sawtooth configuration.

10. The method of electrochemical drilling which comprises positioning a hollow electrode in predetermined spaced relation to an anodically charged workpiece, passing a charged electrolyte through said electrode so as to impinge on said workpiece to initiate hole drilling, said electrolyte being cathodically charged by impressing thereon a negative voltage having a substantial negative DC component and negative pulses superimposed thereon, said pulses providing a ripple which is from 75 to 600% of said negative DC component, the pulses being the sole source of the electrochemical drilling current, and the amplitude of the pulses being insufficient to cause a spark discharge to occur between the electrode and the workpiece, maintaining the same predetermined spacing between said electrode and said workpiece as drilling proceeds, and increasing the voltage when the electrolyte breaks through the hole thus generated.

* * * * *